United States Patent [19]
Laub-Maier

[11] Patent Number: 6,145,471
[45] Date of Patent: Nov. 14, 2000

[54] METHOD OF MECHANICALLY EXTRACTING MILK

[75] Inventor: Maria Laub-Maier, Tuerkheim, Germany

[73] Assignee: Jakob Maier, Tuerkheim, Germany

[21] Appl. No.: 09/171,226

[22] PCT Filed: Apr. 10, 1997

[86] PCT No.: PCT/EP97/01795

§ 371 Date: Mar. 25, 1999

§ 102(e) Date: Mar. 25, 1999

[87] PCT Pub. No.: WO97/37527

PCT Pub. Date: Oct. 16, 1997

[30] Foreign Application Priority Data

Apr. 11, 1996 [DE] Germany .......................... 196 14 377

[51] Int. Cl.$^7$ .......................................................... A01J 5/00
[52] U.S. Cl. ........................................................ 119/14.02
[58] Field of Search ............................. 119/14.01, 14.02, 119/14.03, 14.08

[56] References Cited

U.S. PATENT DOCUMENTS

| | | | |
|---|---|---|---|
| 4,292,926 | 10/1981 | Tilman | 119/14.02 |
| 4,572,104 | 2/1986 | Rubino | 119/14.02 |
| 4,790,261 | 12/1988 | Wartenhorst | 119/14.02 |
| 5,419,280 | 5/1995 | Musha et al. | 119/14.28 |
| 5,443,035 | 8/1995 | Lind et al. | 119/14.02 |
| 5,697,323 | 12/1997 | Visigalli | 119/14.02 |
| 5,970,910 | 10/1999 | Grimm et al. | 119/14.02 |
| 5,979,358 | 11/1999 | Ornerfors et al. | 119/14.02 |
| 5,992,347 | 11/1999 | Innings et al. | 119/14.07 |

FOREIGN PATENT DOCUMENTS

| | | |
|---|---|---|
| 0 522 497 | 1/1993 | European Pat. Off. . |
| 36 24 478 | 1/1988 | Germany . |
| WO 89 08384 | 9/1989 | WIPO . |
| WO 92 22197 | 12/1992 | WIPO . |

*Primary Examiner*—Thomas Price
*Attorney, Agent, or Firm*—Flynn, Thiel, Boutell & Tanis, P.C.

[57] ABSTRACT

In a method for mechanically extracting milk, the pressure in the pulsator chamber of a teat cup is, with regard to the milking vacuum effective below the teat, controlled in such a way that, with due regard to a pressure which is required for folding in a teat rubber and which depends on the respective teat rubber used, a pressure difference between 5 kPa and 35 kPa will act on the teat in order to avoid pathological modifications of the teats.

12 Claims, 2 Drawing Sheets

METHOD OF MECHANICALLY EXTRACTING MILK

FIELD OF THE INVENTION

The present invention refers to a method of mechanically extracting milk in the case of which a substantially constant milking vacuum is applied below the teat while the milk is being milked, the milk being discharged with the aid of a small, substantially constant stream of air introduced in the milk discharge line and the pressure in a pulsator chamber, which is formed between the teat rubber surrounding the teat and a teat cup, being respectively controlled in such a way that, during a teat relief phase, a pressure difference with regard to the milking vacuum applied below the teat will be established.

BACKGROUND OF THE INVENTION

A mechanical milking method of this type is nowadays used in many stables. In the case of this method a so-called teat cup is applied to the teats for milking. The teat cup consists of an outer stiff teat cup sleeve and an elastic tubular insert, the so-called teat rubber. The teat projects into the elastic hose member of the teat rubber during milking. Between the outer surface of the hose member of the teat rubber and the inner surface of the teat cup sleeve a so-called pulsator chamber is defined, which, during milking, has alternately applied thereto a vacuum in a so-called milking phase and atmospheric pressure in a so-called teat relief phase by means of a pulsator. The lower end of the teat is connected via a short hose to a so-called collecting piece, the short lines of the normally four teat cups, which are applied to the respective teats, ending in said collecting piece. The collecting piece communicates with a milk discharge line via a so-called long milk hose. A so-called milking vacuum is applied below the teat via the milk discharge line, the long milk hose and the respective short hoses. Discharge of the milk is achieved by continuously introducing a small stream of air under atmospheric pressure below the teat into the short hose or, in most cases, into the collecting piece.

The discharge of the milk depends to a decisive extent also on the interior cross-section of the hoses used, which have the milking vacuum applied thereto. Hoses having a small interior diameter of approx. 10 to 12 mm here offer the advantage of a particularly smooth discharge of the milk. Milk transport lines with a small interior diameter have, however, the disadvantage that the milking vacuum decreases strongly along the lines so that the vacuum which is actually applied below the teat becomes so low that the teat cups may perhaps fall off the teat, the milking time may become substantially longer, or sufficient emptying of the udder may no longer be guaranteed. In view of these and other reasons, hoses having a larger interior diameter and collecting pieces having larger volumes are increasingly used today so as to guarantee in this way that vacuum losses along the milk hoses are avoided as far as possible so that the nominal milking vacuum is actually applied below the teat without essential variations of the vacuum occurring below the teat.

Although varying milking vacuums, which have hitherto been used successfully, viz. e.g. vacuums between 35 kPa and 50 kPa, were not used in these systems having larger interior cross-sections of the milk transport hoses and a larger volume of the collecting piece, modifications of the teat ends occur when the new system is used. Contrary to all expectations, it has been found that the teat ends turn inside out and remain also in this condition when a prescribed milking unit is used for a prolonged period of time, i.e. it turned out that the teat ends were no longer capable of automatically closing completely, but remained open. Such a teat end is, however, exposed to extreme danger insofar as it may easily be attacked by bacteria whereby undesirable diseases of the udder will be caused. One of the consequences of the modification of the teat end and of the higher susceptibility to bateria resulting therefrom is that milk containing a higher percentage of somatic cells is delivered. Since the quality of the milk is, however, judged by the respective customers buying the milk according to the amount of cells contained in the milk, this will result in a reduction of the quality of the milk which will find expression in substantially lower milk prices.

SUMMARY OF THE INVENTION

It has therefore been the object of the present invention to avoid teat end modifications in the case of the known milking systems described at the beginning.

Taking as a basis a method of the type mentioned at the beginning, this object has been achieved according to the present invention by the features that the pressure difference during the teat relief phase is chosen such that, with due regard to a pressure which is required for folding in the teat rubber and which depends on the respective teat rubber used, a pressure difference between 5 kPa and 35 kPa acts on the teat.

It has been found that, apparently, an excessively high pressure difference acts on the teat end in the teat relief phase, said pressure difference having, in the final analysis, the effect that the teat end turns inside out. Such a modification of the teats was especially detected in cases where the newly developed milking systems having hoses with a large interior diameter were used and the vacuum below the teat virtually corresponded to the nominal milking vacuum and the pressure in the pulsator chamber was controlled such that atmospheric pressure prevailed in the pulsator chamber during the relief phase.

The improvements with regard to less severe modifications of the teat end became increasingly better when the pressure difference acting on the teat was only in the range between 5 kPa and 30 kPa and especially when it was only in the range between 5 kPa and 20 kPa. A particularly advantageous value of the pressure difference, which guaranteed a good and sufficient pressure relief of the teat end on the one hand and which offered the best possible guarantee for preserving the health of the teat end on the other, was approx. 20 kPa.

Upon determining the pressure difference which actually acts on the teat, it must be taken into account that this pressure difference must not be equated with the pressure difference existing between the pressure in the pulsator chamber during the teat relief phase and the vacuum applied below the teat end. It should be taken into consideration that, on the contrary, a certain percentage of the last-mentioned pressure difference is necessary for collapsing the tubular part of the teat rubber, i.e. for causing it to fold in. This is referred to as the so-called fold-in pressure, which may vary depending on the respective material used for the teat rubber in question and on the dimensions of said teat rubber. The fold-in pressures of so-called stiff teat rubbers lie between 12 kPa and 24 kPa, whereas the fold-in pressures of soft teat rubbers approx. lie between 5 kPa and 11 kPa. It follows that this respective fold-in pressure of the teat rubber must be taken into account when, assuming a constant milking vacuum below the teat end, the maximum pressure in the pulsator chamber during the teat relief phase is adjusted; this maximum pressure is intended to result in a pressure difference acting on the teat, which lies in the respective pressure range indicated.

BRIEF DESCRIPTION OF THE DRAWINGS

Further embodiments described in the claims are explicitly included in the description.

In the following, the present invention will be explained in detail on the basis of the drawings, in which.

DETAILED DESCRIPTION OF THE INVENTION

Figure 1A:
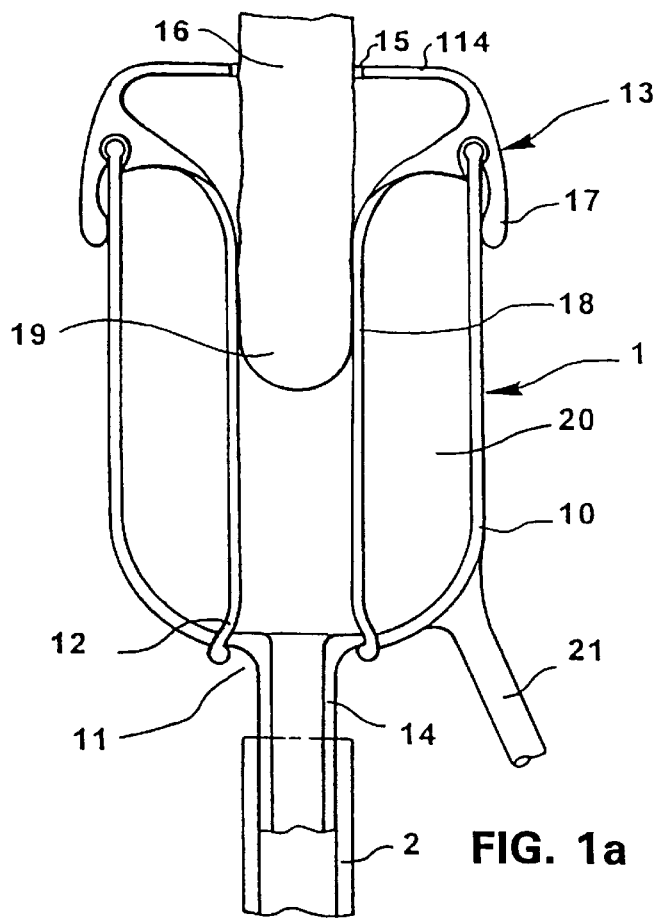
FIG. 1a shows schematically a teat cup attached to a teat.
Figure 1B:
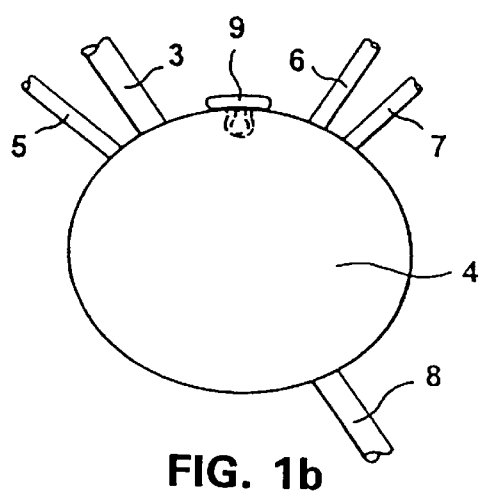
FIG. 1b shows a so-called collecting piece, to which the cup of FIG. 1a is connected.

In FIGS. 1a and 1b, a teat cup attached to a teat is designated by reference numeral 1, said teat cup being connected via a short hose 2 to an inlet 3 of the collecting piece 4, which is schematically represented. The other teat cups, not shown, used for the other teats, are connected to the inlets 5, 6 and 7, which is not shown in detail, and these inlets communicate with the interior of the collecting piece 4. The collecting piece 4 is connected via an outlet 8 to the so-called long milk hose, which, in turn, is connected to the milk discharge line having the nominal milking vacuum applied thereto. In the present embodiment, the collecting piece 4 has provided thereon a valve, which is only schematically shown, said valve admitting a continuous small stream of air under atmospheric pressure into the collecting piece 4 for discharging the milk.

The teat cup 1 consists of an essentially cylindrical teat cup sleeve 10 provided with an opening 11 of reduced width at the lower end thereof, the lower end 12 of the teat rubber 13 being clamped in position in said opening 11 with the aid of a connecting piece 14. The connecting piece 14 is connected to the short milk hose 2. The teat rubber 13 consists of a head 114 with a central opening 15 having the teat 16 inserted therein. The head 114, which sealingly abuts on the outer surface of the teat cup sleeve 10 via projections 17, is followed by a tubular part 18 surrounding especially the lower end 19 of the teat. Between the outer surface of the tubular part 18 of the teat rubber and the inner wall of the teat cup sleeve 10, an annular pulsator chamber 20 is formed. This pulsator chamber communicates via a line 21 with a pulsator, which is not shown in detail and which cyclically controls the pulsator chamber 20 such that it varies between two pressure limit values. In FIG. 1a the teat cup is shown in the condition in which the milking cycle is in the suction phase. In this condition, the pressure in the pulsator chamber 20 has been reduced relative to the milking vacuum applied below the teat to such a value that the tubular part 18 of the teat rubber 13 is in its tubular, i.e. non-collapsed condition.

Figure 2:
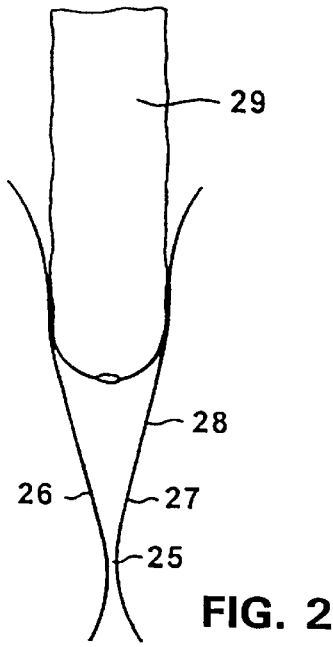
FIG. 2 shows schematically a teat encompassed by the tubular part of a so-called stiff teat rubber in the teat relief cycle.
Figure 3:
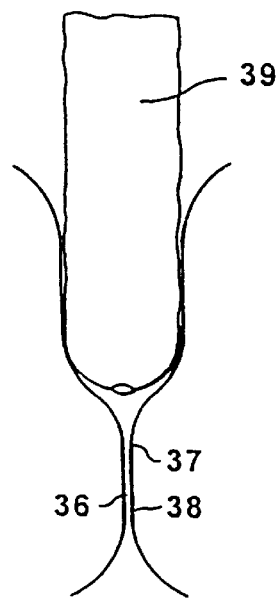
FIG. 3 shows a similar representation as in FIG. 2, the teat rubber consisting of a so-called soft rubber.

FIGS. 2 and 3 each show a teat end 29 and 39, respectively, and the tubular part of the teat rubber 28 and 38, respectively, is schematically shown in each of said figures in the collapsed, i.e. folded-in condition. At this time, the pressure prevailing in the pulsator chamber is higher than the vacuum effective below the teat so that the tubular part of the teat rubber loses its tubular shape and collapses in the form of a squashed tube. FIGS. 2 and 3 differ insofar as a so-called stiff rubber has been used in FIG. 2, whereas in FIG. 3 the behaviour of a so-called soft rubber is shown. As can be seen from FIG. 2 very clearly, the opposing lateral surfaces 26 and 27 of the teat rubber 28 contact each other approximately proximately at point 25 which is located below the teat end 29 at a comparatively large distance therefrom. In this case, the lateral surfaces 26 and 27 define an acute triangle starting from the vertex 25 and the two legs of this triangle press in a virtually wedge-shaped configuration onto the opposing sides of the teat end 29 approximately in the form of rigid legs.

In the case of the soft rubber shown in FIG. 3, the tubular teat rubber 38 is squashed in the collapsed state in such a way that the opposing lateral surfaces 36 and 37 abut on one another over a substantially longer distance. The soft teat rubber 38 virtually clings softly to the lower teat end over a larger surface of said teat end. In this way, a uniform pressure is applied to the surface of the lower teat from the end of the stroke passage.

From a comparison between FIGS. 2 and 3, it can be derived why, in cases in which soft teat rubbers are used, even higher pressures in the teat relief cycle apparently do not result in damage of the udder which is as severe as that caused by stiffer teat rubbers. When, as shown in FIG. 2, a stiffer teat rubber is used, the collapsing tubular part 28 of the teat rubber produces an effect which can practically be compared to that of a pair of pliers whose fulcrum is the point 25 and whose legs 26 and 27 press onto two opposing sides of the teat; in the case of higher pressures this will inevitably have the effect that the lower end of the stroke passage is squeezed out and turned inside out, whereas, as can be seen from FIG. 3, a soft teat rubber will encompass the whole lower end of the teat in a supporting manner in the teat relief cycle so that pressures can be applied to the teat which are even higher than those applied in connection with a stiff teat rubber without any permanent damage being caused.

Figure 4:
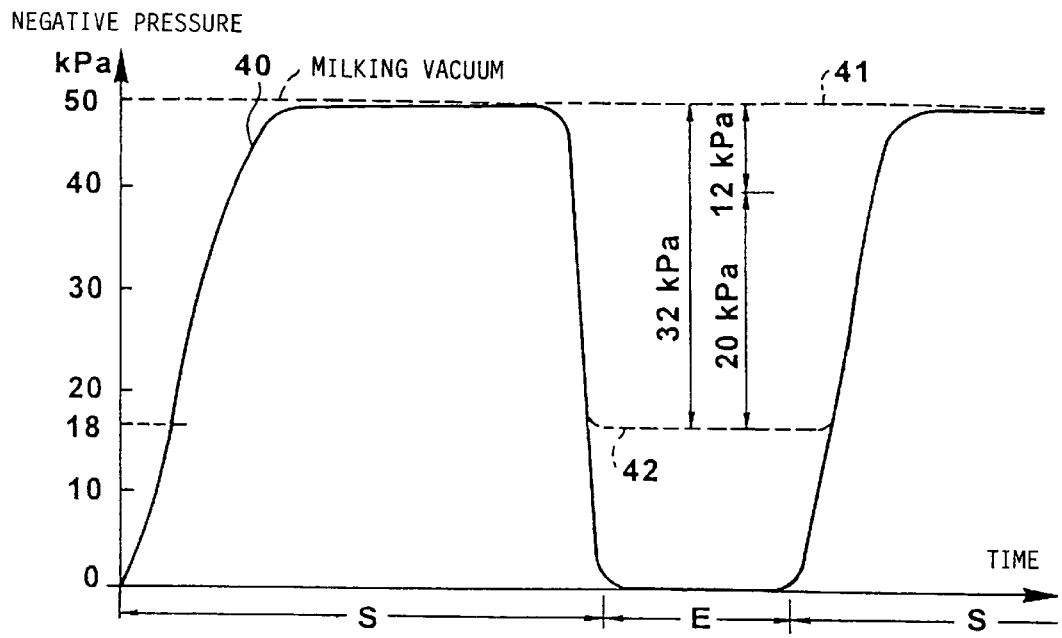
FIG. 4 shows a diagram of the development of the pressure in the pulsator chamber for a milking unit according to the hitherto known prior art and, in comparison therewith, the characteristic of the curve representative of the pressure in the pulsator chamber according to the present invention.

In FIG. 4, the curve 40 represented by the solid line shows the development of the pressure with time in the pulsator chamber 20, which normally occurs in the above-described milking systems. In this example, the milking vacuum below the teat corresponds to a negative pressure of 50 kPa. This milking vacuum, which is, in principle, comparatively constant, is represented by the broken line 41. On the time axis the cyclically alternating phases, viz. the suction cycle "S" and the relief cycle "E", are shown in their time intervals. During the suction cycle the negative pressure increases from virtually atmospheric pressure or the negative pressure zero to a negative pressure of 50 kPa and maintains this value during a prolonged period of time prior to dropping again to the negative pressure zero at the end of the suction cycle. At least during the period of time in which the negative pressure in the pulsator chamber is 50 kPa and is therefore equal to the milking vacuum, identical pressures act on the inner and on the outer surface of the tubular part of the teat rubber so that this part of the teat rubber will assume its tubular shape, which means that the milk extracted can flow off unhindered. During the relief cycle "E" the negative pressure in the pulsator chamber is equal to zero, i.e. atmospheric pressure prevails in the pulsator chamber. During this period of time, the pressure difference between the milking vacuum below the teat and the interior of the pulsator chamber is highest, i.e. it amounts to 50 kPa in the case of the present embodiment. When the fold-in pressure of the respective teat rubber used is deducted from this value, said fold-in pressure being approx. 5 to 11 kPa in the case of soft rubbers and 12 to 24 kPa in the case of stiff rubbers, a pressure of 38 to 45 kPa is obtained in the case of soft rubbers and a pressure of 26 to 38 kPa in the case of stiff rubbers. These pressures acting on the teat are too high. This applies especially to the new breeds of cattle. The breeding aimed at cows giving large amounts of milk and having a high flow of milk during milking. This resulted in cows having comparatively short teats with comparatively thin teat ends in contrast to the former comparatively fleshy teat ends, said thin teat ends being so to speak completely unpadded. Apparently, these very thin teat ends are particularly susceptible to damage caused by excessive pressure loads.

In the example shown in FIG. 4, a teat rubber having a fold-in pressure of 12 kPa has now been chosen for a milking system of the type described at the beginning. When teat rubbers having fold-in pressures in a range between 12 kPa and approx. 24 kPa are referred to as stiff teat rubbers, this fold-in pressure corresponds to a teat rubber at the lower end of the range of stiff teat rubbers. Teat rubbers having a fold-in pressure in the range between 5 kPa and 11 kPa then are to be regarded as soft teat rubbers. With a milking vacuum below the teat of approx. 50 kPa, the pressure in the pulsator chamber was controlled in such a way that during the suction phase "S" the vacuum in the pulsator chamber increased up to a maximum value of 50 kPa, whereas in the relief phase "E" the vacuum decreased to only 18 kPa in accordance with the broken line 42 shown in FIG. 4 and increased then, in the next cycle, again to 50 kPa in the suction phase. Hence, a pressure difference of 32 kPa between the pressure in the pulsator chamber and the milking vacuum below the teat has been obtained for the relief cycle. Taking into account that a pressure of 12 kPa is necessary for collapsing the tubular part of the teat rubber in the relief cycle, it turns out that, in the relief cycle, a maximum pressure difference of 20 kPa between the outer surface of the tubular teat rubber and the pressure below the teat end was effective and applied to the teat end. It turnd out that, under these conditions, modifications of the teat end were prevented also in the case of prolonged milking, precisely when the milked teats were very thin.

Figure 5:
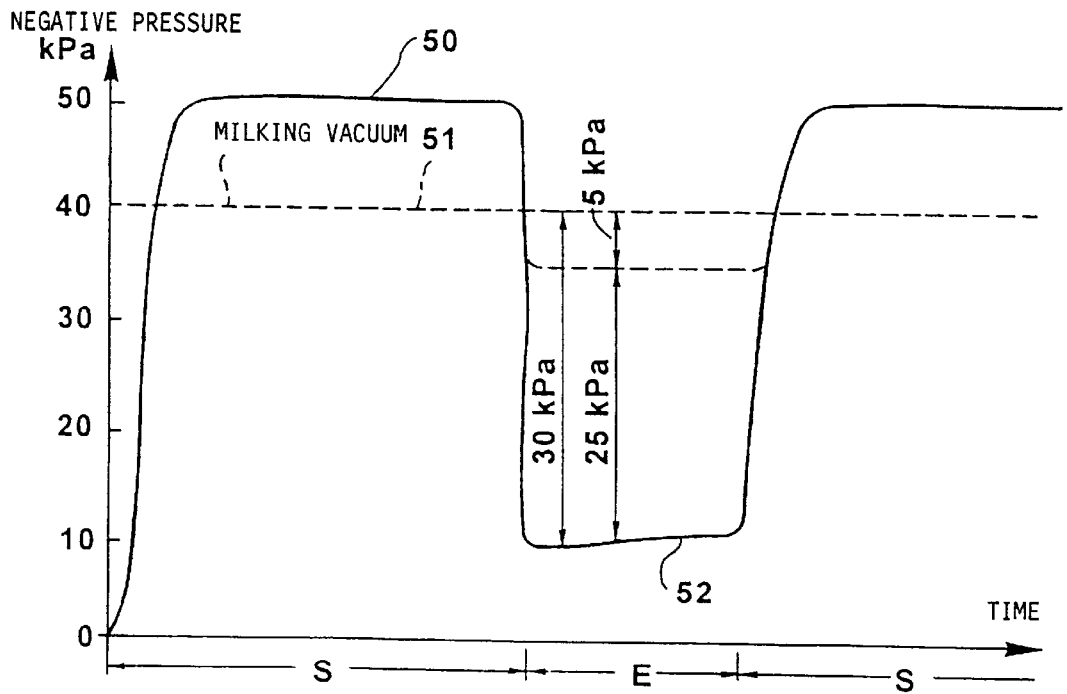
FIG. 5 shows a representation of the development of the pressure in the pulsator chamber according to the present invention, the maximum negative pressure in the pulsator chamber being not coincident with the milking vacuum.

In the embodiment shown in FIG. 5, the solid curve 50 is representative of the development of the pressure in the pulsator chamber as a function of time. In this embodiment, a teat rubber was used which may be described as extremely soft and which had a fold-in pressure of only 5 kPa. Furthermore, a milking vacuum below the teat of approx. 40 kPa, which could be considered to be substantially constant, was used in this embodiment. For this reason, the milking vacuum in FIG. 5 is represented as a broken line on a constant level. In addition, a higher negative pressure of 50 kPa in comparison with the milking vacuum of 40 kPa was used in the pulsator chamber during the suction phase "S" in the case of this example. During the suction phase maximum, this resulted in an outwardly directed tension acting on the tubular part of the teat rubber, which tended to inflate the teat rubber still further.

In the relief phase "E", the vacuum in the pulsator chamber was only reduced to a negative pressure of 10 kPa (cf. line 52 of the pressure characteristic). Hence, there was a pressure difference of 30 kPa between the pulsator chamber and the milking vacuum below the teat in the relief phase. Taking into account that a pressure of 5 kPa was necessary for bringing the teat rubber to the collapsed condition, there was a remaining pressure difference of 25 kPa which acted as pressure on the teat in the relief phase.

Quite generally it has been found that, in cases where the milking vacuum below the teat is 40 kPa and where stiff teat rubbers having a fold-in pressure between 12 and 24 kPa are used, a pressure of 20 to 10 kPa on the teats in the relief cycle proved to be acceptable. A pressure of 20 kPa is in this case used for a teat rubber having a fold-in pressure of approx. 12 kPa, whereas a pressure of 10 kPa is used for a very stiff teat rubber having a fold-in pressure of 24 kPa. This reflects the tendency that, the stiffer the teat rubbers are, i.e. the higher their fold-in pressure is, the stronger their plier-like effect on the teat will be. It follows that, the stiffer a teat rubber is, the smaller the still tolerable pressure difference, which may act on the teat in the relief phase, will be. Choosing again a milking vacuum of 40 kPa, it turns out in a similar way that, for the so-called soft teat rubbers, i.e. teat rubbers having a fold-in pressure between 5 and 11 kPa, the pressure difference should preferably lie between 25 and 20 kPa, i.e. approx. 25 kPa for teat rubbers having a fold-in pressure of 5 kPa and 20 kPa for teat rubber having a fold-in pressure of 11 kPa. This again reflects the tendency that, the softer the teat rubber is, the higher the pressure difference can be chosen; the softer the teat rubber is, the more closely can it cling to the teat, which will have the effect that a uniform pressure will be applied to the largest possible area of the teat end, if possible up to the stroke passage.

When a higher milking vacuum is used, e.g. 50 kPa, it turned out that, for obtaining a better relief from a higher milking vacuum which is effective below the teat, a higher pressure difference is here apparently admissible and possibly also desirable. Using stiff teat rubbers having a fold-in pressure between 12 and 24 kPa, the acceptable range for the pressure difference acting on the teat was therefore between 30 kPa and 20 kPa, again with regard to the lowest and highest fold-in pressure of the teat rubber.

Using again a milking vacuum of 50 kPa, a still acceptable range of 35 kPa to 30 kPa for the pressure difference acting on the teat end in the relief cycle was in the same way obtained for so-called soft teat rubbers having a fold-in pressure between 5 and 11 kPa.

When a milking vacuum of 35 kPa is used below the teat, the maximum admissible pressure differences are between 20 and 10 kPa, preferably, however, 15 to 5 kPa, when the teat rubbers used have a fold-in pressure between 12 and 24 kPa. When the teat rubbers used have a fold-in pressure between 5 and 11 kPa, the maximum pressure difference amounts to 25 to 20 kPa, preferably, however, to 20 to 15 kPa, when a milking vacuum of 35 kPa is used.

As has already been mentioned hereinbefore, a higher milking vacuum below the teat also permits the use of higher maximum pressure differences. Only for the purpose of revealing how the changes of the maximum admissible pressure difference depend on the milking vacuum, ranges for three different teat rubbers with different fold-in pressures will be indicated hereinbelow. If the milking vacuum is chosen in a range between 35 and 50 kPa and if a teat rubber having a fold-in pressure of 24 kPa is used, the maximum admissible pressure difference will be between 5 and 20 kPa depending on the respective milking vacuum, if a teat rubber having a fold-in pressure of 11 kPa is used, it will be between 20 and 30 kPa, and preferably between 15 and 30 kPa, and if a teat rubber having a fold-in pressure of 5 kPa is used, it will be between a maximum pressure difference of 25 and 35 kPa, and preferably 20 and 35 kPa. The lower values of a range are in this case associated with the respective low milking vacuum of 35 kPa and the upper values of the range are associated with a milking vacuum of 50 kPa, whereas the intermediate values are to be associated with the milking vacuums lying between 35 and 50 kPa.

The disclosed values for the pressure differences under the conditions indicated essentially refer to the maximum pressure differences, which, if used for a prolonged period of time, should not be exceeded, if possible. It goes without saying that, in all cases, also lower pressure differences are admissible, provided that the pressure difference will always be higher than approx. 5 kPa.

What is claimed is:

1. A method of mechanically extracting milk, comprising the steps of:

applying a substantially constant milking vacuum below a teat to be milked, so as to extract milk from the teat;

discharging the milk extracted by introducing a substantially constant stream of air into a milk discharge line coupled to the teat; and controlling a pressure in a pulsator chamber formed between a teat rubber, surrounding the teat and a teat cup such that during a teat relief phase a pressure difference with respect to the milking vacuum is obtained, wherein the pressure difference is selected such that, depending on a fold-in pressure required for folding in the teat rubber, the pressure difference acting on the teat being in a range from 5 kPa to 35 kPa.

2. A method according to claim 1, wherein when the fold-in pressure of the teat rubber is between 5 kPa and 24 kPa, the pressure difference is between 10 kPa and 35 kPa.

3. A method according to claim 2, wherein when the milking vacuum below the teat is 40 kPa and when the fold-in pressure of the teat rubber is between 12 and 24 kPa, the pressure difference is from 10 to 20 kPa.

4. A method according to claim 2, wherein when the milking vacuum below the teat is 40 kPa and the fold-in pressure of the teat rubber is between 5 and 11 kPa, the pressure difference is from 20 to 25 kPa.

5. A method according to claim 2, wherein when the milking vacuum below the teat is 50 kPa and the fold-in pressure of the teat rubber is between 12 and 24 kPa, the pressure difference is between 20 and 30 kPa.

6. A method according to claim 2, wherein when the milking vacuum below the teat is 50 kPa and the fold-in pressure of the teat rubber is between 5 and 11 kPa, the pressure difference is between 30 and 35 kPa.

7. A method according to claim 2, wherein when the milking vacuum effective below the teat is between 35 and 50 kPa, the pressure difference acting on the teat during the teat relief phase is between 5 and 20 kPa when the fold-in pressure of the teat rubber is 24 kPa; the pressure difference is between 15 and 30 kPa when the fold-in pressure of the teat rubber is 11 kPa; and the pressure difference is between 20 and 35 kPa when the fold-in pressure of the teat rubber is 5 kPa.

8. A method according to claim 1, wherein when the milking vacuum below the teat is 40 kPa and when the fold-in pressure of the teat rubber is between 12 and 24 kPa, the pressure difference is from 10 to 20 kPa.

9. A method according to claim 1, wherein when the milking vacuum below the teat is 40 kPa and the fold-in pressure of the teat rubber is between 5 and 11 kPa, the pressure difference is from 20 to 25 kPa.

10. A method according to claim 1, wherein when the milking vacuum below the teat is 50 kPa and the fold-in pressure of the teat rubber is between 12 and 24 kPa, the pressure difference is between 20 and 30 kPa.

11. A method according to claim 1, wherein when the milking vacuum below the teat is 50 kPa and the fold-in pressure of the teat rubber is between 5 and 11 kPa, the pressure difference is between 30 and 35 kPa.

12. A method according to claim 1, wherein when the milking vacuum effective below the teat is between 35 and 50 kPa, the pressure difference acting on the teat during the teat relief phase is between 5 and 20 kPa when the fold-in pressure of the teat rubber is 24 kPa; the pressure difference is between 15 and 30 kPa when the fold-in pressure of the teat rubber is 11 kPa; and the pressure difference is between 20 and 35 kPa when the fold-in pressure of the teat rubber is 5 kPa.

* * * * *